Feb. 27, 1968
W. H. ANTLE
3,370,657
STABILIZER AND DEFLECTING TOOL
Filed Oct. 24, 1965
4 Sheets-Sheet 1
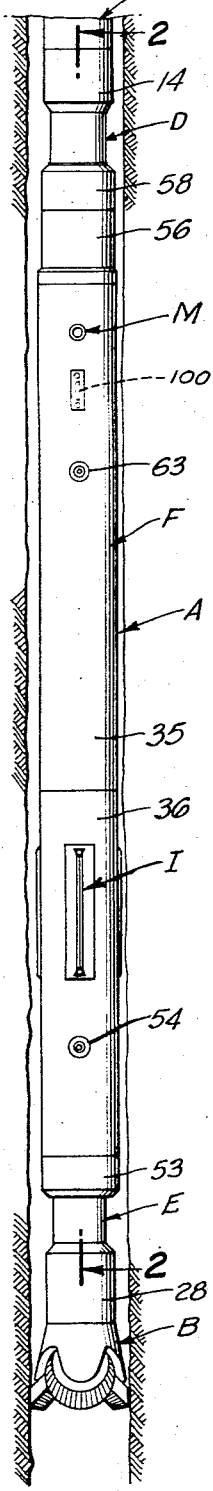
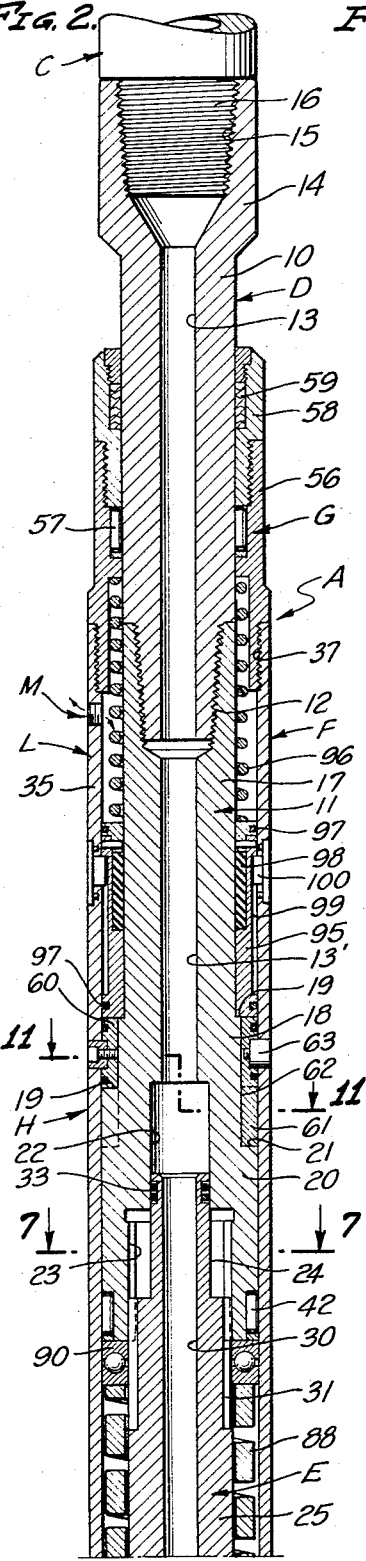
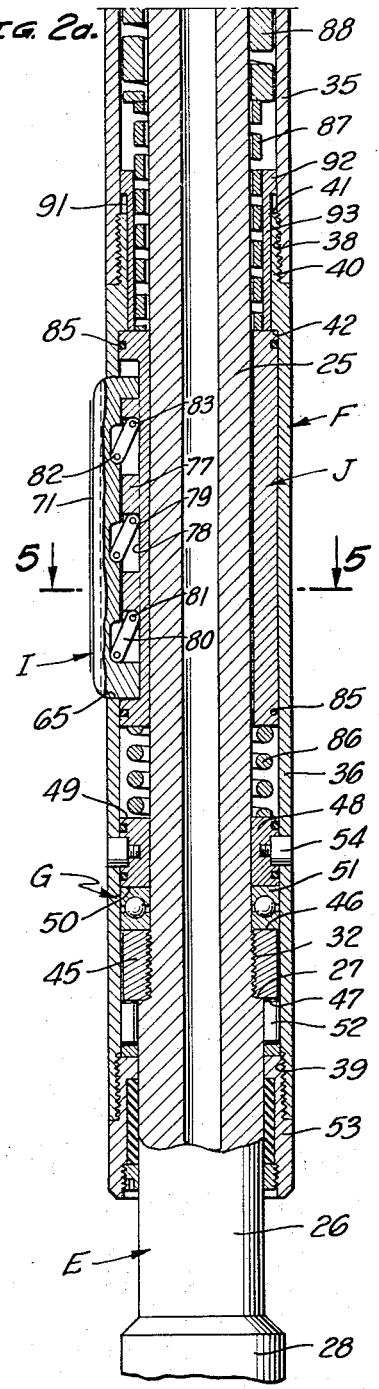
INVENTOR.
WADE H. ANTLE
BY
AGENT

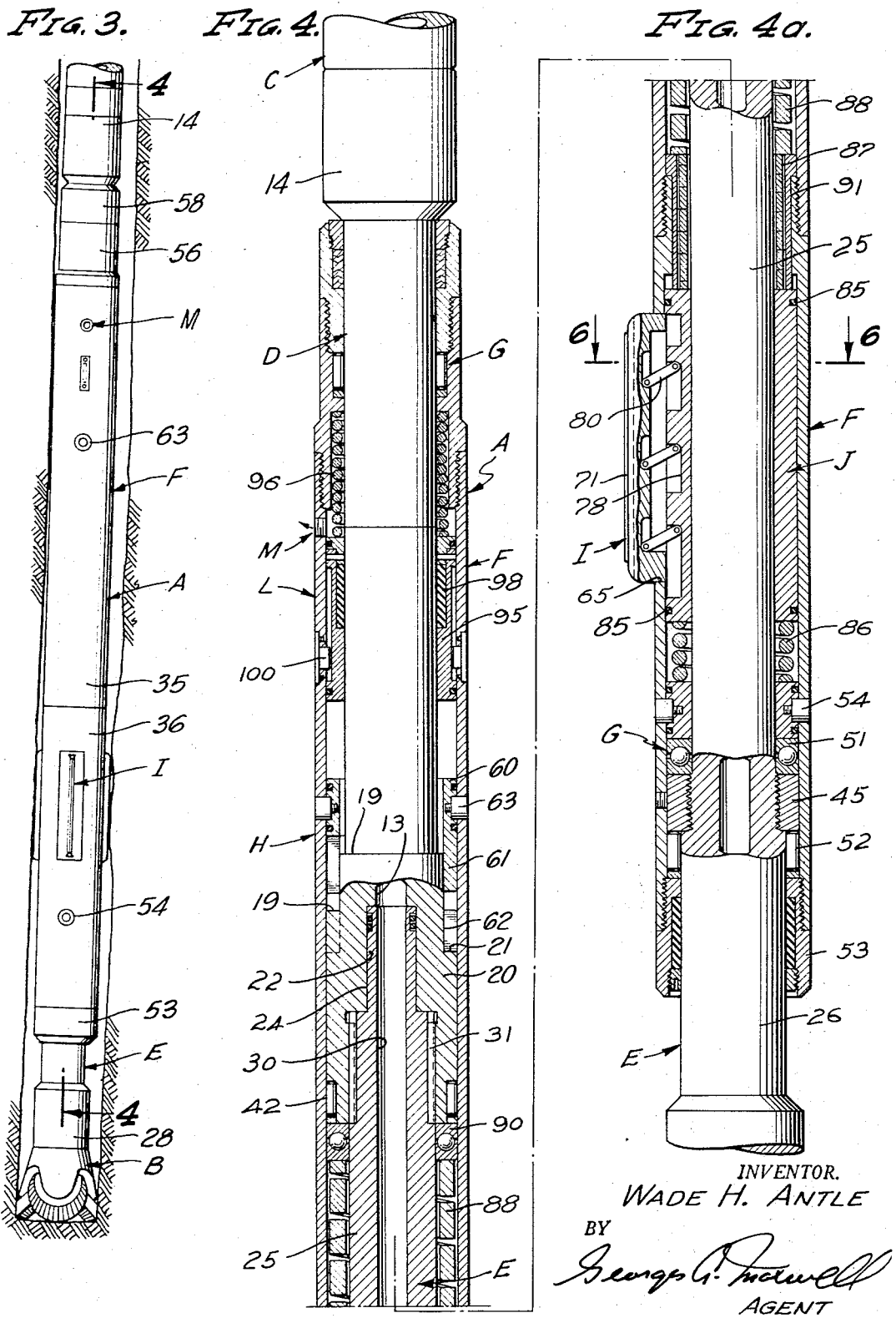

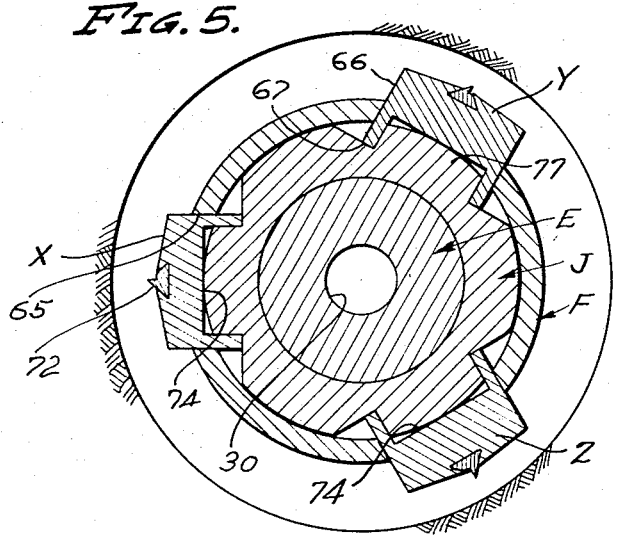
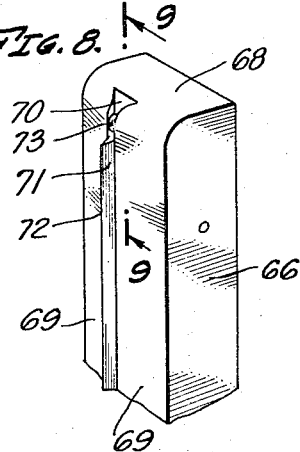
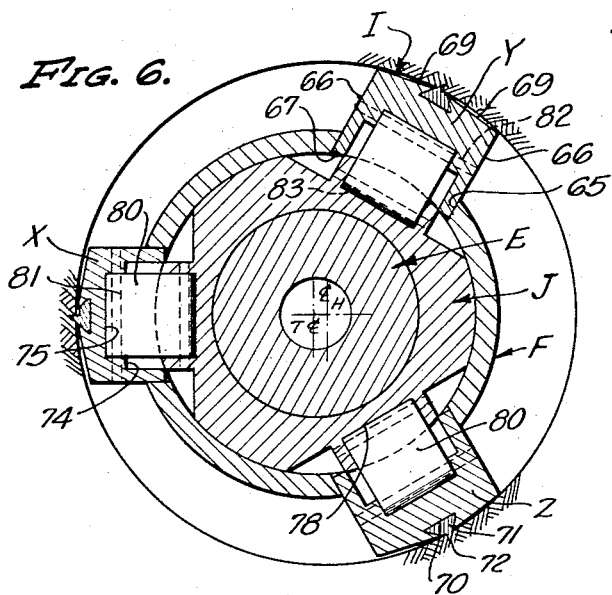
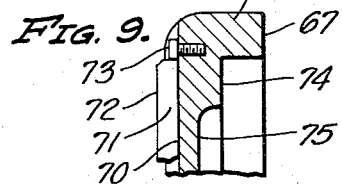
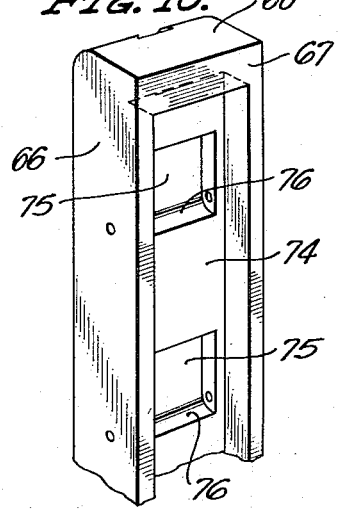
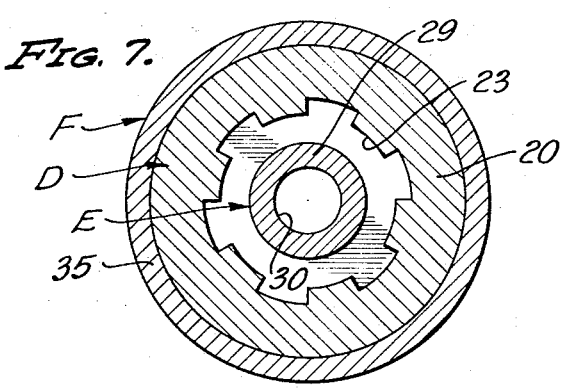
INVENTOR.
WADE H. ANTLE

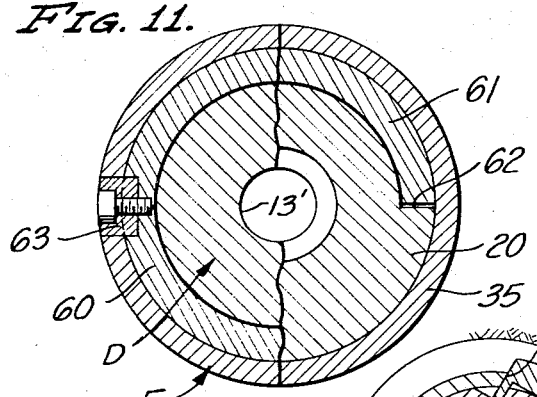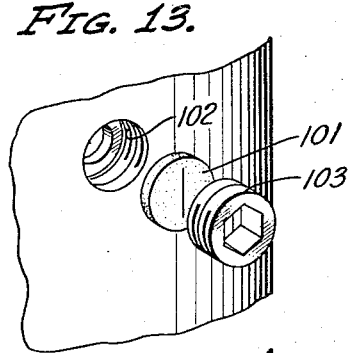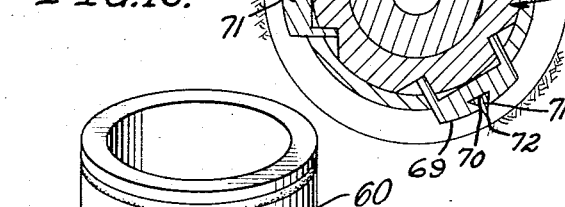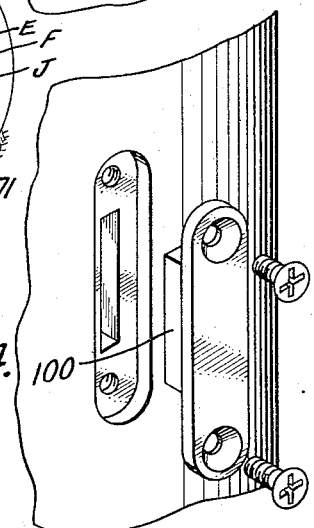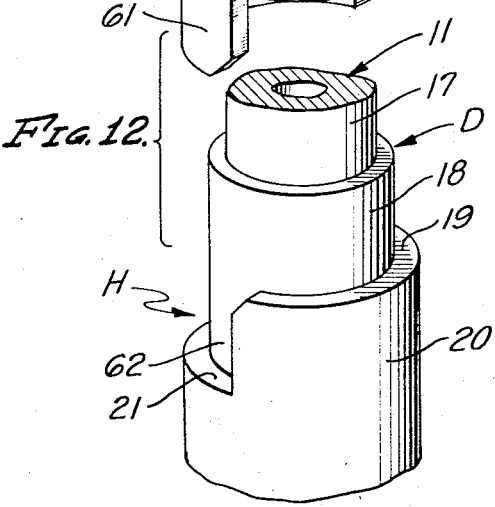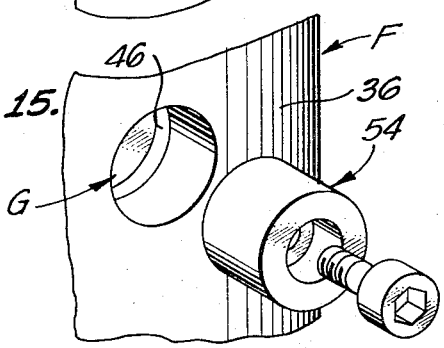

United States Patent Office 3,370,657
Patented Feb. 27, 1968

3,370,657
STABILIZER AND DEFLECTING TOOL
Wade H. Antle, Long Beach, Calif., assignor to Trudril, Inc., Zephyr Cove, Nev., a corporation of Nevada
Filed Oct. 24, 1965, Ser. No. 504,692
11 Claims. (Cl. 175—74)

ABSTRACT OF THE DISCLOSURE

A stabilizer and deflecting tool engageable between the lower end of a string of drill pipe and a rotary bit of a well drilling structure including, an elongated, vertically disposed, fluid conducting body having a splined socket entering its lower end and secured to a depending from the drill pipe string, an elongated, vertically disposed, fluid conducting mandrel having a splined upper end portion secured to and projecting upwardly from the bit with its splined portion telescopically engaged in the socket in the body to prevent relative rotation and allow for relative axial shifting between the body and mandrel, an elongate, vertically disposed, tubular shell surrounding the mandrel and the body and having a plurality of circumferentially spaced openings therein, means coupling the shell to the body for free relative rotation and for limited relative axial shifting, anti-friction bearing means coupling the lower end of the shell to the mandrel for free relative rotation and against relative axial shifting, an axially shiftable carriage in the shell and surrounding the mandrel, a plurality of circumferentially spaced bore engaging shoes engaged in the openings in the shell for radial shifting only, means operatively connecting the carriage to the shoes to urge the shoes radially outwardly in the openings in the shell upon downward movement of the carriage, a first spring means between the shell and the carriage yieldingly urging the carriage upwardly, and a second spring means in the shell between the lower end of the body and the carriage to urge the carriage downwardly against the resistance of the first spring means upon downward movement of the body relative to the mandrel and the shell.

---

This invention relates to an oil tool and is more particularly concerned with a combination stabilizer and deflecting tool.

In the course of drilling an oil well, or the like, and employing conventional rotary methods and apparatuses, it has been found that the digging or cutting bit does not maintain constant, uniform contact with the bottom of the well bore, but shifts radially and bounces vertically. The bit is frequently out of bearing and cutting engagement with the bottom of the well bore forty percent of the time.

As a result of the above, the ordinary or conventional rotary bit which is designed for maximum performance and efficiency on the premise that it remains in constant bearing and cutting engagement with the bottom of the well bore, does not operate efficiently and is subjected to severe pounding and adverse wearing conditions which materially reduce its effective life.

Due to the radial shifting to the bit, the bore established thereby is enlarged until the lower end of the drill string actually whips about in the well bore creating further adverse effects and obvious difficulties.

Attempts have been made to stabilize bits in wells, but such attempts have met with little or no success. Such attempts have included the provision of rigid, radially outwardly projecting, bore-engaging ribs or shoes applied to certain parts of the drilling structure. These shoes are intended to engage the wall of the bore and prevent the structure from shifting radially therein. However, since such shoes cannot be larger than the upper or smaller portion of the well bore, in order for their insertion into the well bore, they do little more than temporarily reduce the adverse effects they are intended to eliminate, when they are located in the enlarged portion of the well bore. Further, such shoes normally rotate with the drilling apparatus, with the result that they soon wear out. Further, such shoes wear on and further enlarge the well bore and frequently create added adverse effects.

Other attempts to stabilize rotary bits in wells have included the provision of bore-engaging members applicable to parts of the drilling structure, which members are shifted radially outward so as to insure their engagement with the wall of the enlarged portion of the well bore, as the drilling operation proceeds. Due to the shiftably or what may be termed the resilient nature of such members, they do not prevent radial movement of the drilling structure in the well bore, but simply tend to cushion and retard it somewhat.

An object of the present invention is to provide a well tool adapted to prevent a rotary bit from shifting radially in a well bore and to thereby insure more uniform bearing and cutting engagement of the bit on the bottom of the well bore.

Another object of my invention is to provide a tool of the character referred to which is adapted to be engaged between the bit and a drill collar and which is provided with a plurality of radially outwardly shiftable, bore-engaging guide shoes, which shoes are mounted for rotation relative to the bit and remain in fixed circumferential position in the well bore.

Another object of the present invention is to provide a tool of the character referred to wherein the shoes are provided with blade-like guide members to engage the walls of the well bore and to guide the shoes longitudinally in the bore and positively prevent circumferential movement thereof.

Still another object of my invention is to provide a novel operating mechanism for shifting the shoes outwardly and to releasably maintain them in their out or actuated position.

It is another object of the present invention to provide a tool of the character referred to that can be advantageously oriented in a well bore before the drill string and bit are rotated and a tool wherein the weight of the drill string, occurring above the tool, is employed to actuate the tool.

Another object of my invention is to provide an operating mechanism for a tool of the character referred to wherein a limited amount of weight is required for its operation and so that excessive weight need not be exerted through the tool and onto the bit prior to setting the bit into rotation.

In the course of drilling an oil well, it frequently becomes necessary to direct the bit laterally in a predetermined direction. The prior art has provided many directional drilling tools for carrying out such an operation, the most common of which is in the nature of a wedge insertable into the bottom of a well and which serves to deflect the bit laterally as desired.

Another object of the present invention is to provide a structure of the character referred to wherein all of the critical moving parts are sealed in oil.

It is an object of the present invention to provide a tool of the character referred to which is easy and economical to manufacture and a tool which is highly effective and dependable in operation.

The various objects and features of my invention will be fully understood from the following detailed description of a typical preferred form and application of my invention, throughout which description reference is made to the accompanying drawings, in which:

FIG. 1 is an elevational view of the tool that I provide, showing it related to a drill string and rotary bit and positioned in a well bore;

FIG. 2 and FIG. 2a are longitudinal, sectional views of the tool provided by the present invention and taken as indicated by line 2—2 on FIG. 1. FIGS. 2 and 2a show the construction in an unactuated position;

FIG. 3 is an elevational view similar to FIG. 1 and showing the construction in an actuated position;

FIGS. 4 and 4a are longitudinal sectional views taken as indicated by line 4—4 on FIG. 3 and showing the tool in an actuated position.

FIG. 5 is a transverse sectional view taken as indicated by line 5—5 on FIG. 2a

FIG. 6 is a transverse sectional view taken as indicated by line 6—6 on FIG. 4a;

FIG. 7 is a transverse sectional view taken as indicated by line 7—7 on FIG. 2 of the drawings;

FIG. 8 is a perspective view of a portion of the bore-engaging guide shoes that I provide and showing the top, front and one side thereof;

FIG. 9 is a sectional view of a portion of the shoe illustrated in FIG. 8 of the drawings and taken as indicated by line 9—9 on FIG. 8;

FIG. 10 is a perspective view of the shoe illustrated in FIG. 8 of the drawings and showing the top, back and other side thereof;

FIG. 11 is an enlarged detailed sectional view of the construction taken as indicated by line 11—11 on FIG. 2 of the drawings;

FIG. 12 is an exploded perspective view of a portion of my clutch construction;

FIG. 13, FIG. 14 and FIG. 15 are exploded perspective views of portions of my new tool and are provided to better illustrate certain details of the construction; and FIG. 16 is a view similar to FIG. 5, on a reduced scale and showing a modified form of my invention.

The stabilizer and deflecting tool A provided by the present invention and illustrated throughout the drawings is adapted to be engaged between the bit B and the drill collar C of a conventional drilling apparatus and is shown as including, generally, an elongate, vertically disposed, tubular fluid conducting body D fixed to and depending from the drill collar C, an elongate, vertically disposed, tubular fluid conducting mandrel E fixed to the bit B to project upwardly therefrom and telescopically engage the body D, an elongate, vertically disposed, tubular shell F surrounding the body and the mandrel E, bearing means G rotatably coupling the shell F to the mandrel E, longitudinally shiftable clutch means H coupling the shell F and the body D against longitudinal displacement and operable to make and break rotary driving engagement therebetween, a plurality of circumferentially spaced guide shoes I shiftably carried by the mandrel and operatively coupled to the shoes and spring means K related to the body A, shell F, clutch means H and the carriage J and adapted to release the clutch means and to actuate the carriage and guide shoes upon relative longitudinal shifting of the body and the mandrel.

The structure A that I provide further includes a suitable closed oiling system, which system involves the provision of a suitable seal throughout the construction, a suitable oil-accumulator means L and a breather M.

The fluid conducting body D of the tool A provided by the present invention, is an elongate tubular member having upper and lower sections 10 and 11 of limited diametric extent and threadedly connected together as at 12.

The upper section 10 of the body has a central longitudinal flow passage 13 extending through it and is provided with an enlargement 14 at its upper end, which enlargement is provided with a central, internally threaded, upwardly opening socket 15 in which the stem 16 of the drill collar C is threadedly engaged.

The lower section 11 of the body D is an elongate, vertically disposed, cylindrical member having an upper portion 17 corresponding in outside diameter with the upper section, an intermediate portion 18 of slightly larger diametric extent than the upper portion and establishing an upwardly facing shoulder 19, and an enlarged lower portion 20 establishing an upwardly facing clutch shoulder 21. The section 11 is provided with a central, longitudinally disposed flow passage 13' which establishes open communication with the flow passage 13 in the upper section 10, a downwardly opening bore 22 entering it from its lower end and concentric with the flow passage, and a downwardly opening splined counterbore 23 concentric with said bore.

The fluid conducting mandrel E has an elongate, upper portion 25 of limited diametric extent, a central portion 26, which portion is of limited longitudinal extent and is slightly larger in diametric extent than the upper portion to establish an upwardly facing shoulder 27, and an enlarged portion 28. The mandrel E is further provided with an extension 24 of reduced diameter at its upper end and a central longitudinally disposed flow passage 30 extending from one end thereof to the other. The lower enlarged portion 28 of the mandrel E is provided with a central, downwardly opening, internally threaded socket, (not shown), which socket is adapted to threadedly receive the threaded stem of the bit B, (not shown).

The upper end of the central portion 25 of the mandrel is splined as at 31 and slidably enters the splined counterbore 23 in the lower end of the body, while the lower end of the said upper portion is threaded as at 32, to receive a part of the bearing means G, as will hereinafter be described.

The extension 24 on the mandrel E projects upwardly from the upper terminal end of the upper portion and slidably enters the bore 22 in the body and serves to establish open communication between the flow passages 13' and 30 of the body and the mandrel. In practice, and as illustrated in the drawings, as suitable sealing means 33 is carried by the extension 24 to seal with the bore 22 and prevent the flow or leakage of fluid between the said parts.

With the structure thus far described, it will be apparent that the body D and mandrel E, connected with the drill collar C and carrying the bit B, are engaged with each other for longitudinal shifting and for rotary drive and serve to conduct circulating fluid from the drill collar to the bit.

The shell F of the tool A provided by the present invention is an elongate, tubular structure and involves generally, an upper tube section 35 and a lower tube section 36.

The upper tube section 35 is a simple, straight, open-ended, tubular member and is internally threaded at its upper and lower ends as at 37 and 38. The lower tube section 36 is a straight, open-ended tubular member internally threaded at its lower end and is provided with an upwardly projecting externally threaded nipple-like extension 40 at its upper end. The nipple extension 40 is threadedly engaged in the threads 38 in the lower end of the upper section 35 and establishes upwardly and downwardly facing shoulders 41 and 42 in the shell.

The shell F is engaged about body D and mandrel E and establishes sliding engagement around the enlarged lower portion 20 of the body, as clearly illustrated in the drawings.

In practice, a suitable annular roller bearing 42 is carried by said enlarged portion 20 of the body to engage the interior of the upper section of the shell F and thereby allow for free relative rotation between the body and the shell.

The bearing means G rotatably coupling the shell F to the body D and mandrel E is shown as including, a radially outwardly projecting stop ring 45 engaged on the threads 32 at the lower end of the upper portion 25 of the mandrel and establishing upwardly and downwardly facing shoulders 46 and 47, a radially inwardly projecting stop collar 48 engaged in the lower section of the shell to occur in spaced relationship above the stop ring 45 and defining upwardly and downwardly facing shoulders 49 and 50, an anti-friction ball bearing 51 arranged between the opposing shoulders 46 and 50 of the stop ring and stop collar, an anti-friction roller bearing 52 engaged around and carried by the intermediate portion 26 of the mandrel and establishing rolling bearing engagement with the interior of the shell, and a retainer sleeve 53 threadedly engaged in the lower end of the shell and maintaining the roller bearing in proper working position.

The stop collar 48 is releasably engaged in the shell for the purpose of assembly. The collar 48 is maintained in proper working position in the shell by a pair of suitable shear plug-type fastening means 54, details of which are clearly illustrated in FIG. 15 of the drawings.

In the preferred carrying out of the invention, the retaining sleeve 53 is provided with an inwardly and downwardly opening annular cavity in which is arranged a suitable chevron-type packing 55, which packing establishes a fluid tight seal between the lower end of the shell assembly and the mandrel. The packing is retained in the cavity by a suitable follower 53ª threadedly engaged in the lower end of the cavity.

With the portion of the bearing means set forth above, it will be apparent that the shell F is suitably coupled to the mandrel E for free relative rotation thereabout and against longitudinal or axial shifting and displacement.

The bearing means G further includes an upper bearing sleeve 56 threadedly engaged in the upper end of the shell F and carrying a suitable annular roller bearing 57, which bearing establishes rolling bearing engagement about the upper section 10 of the body. The bearing 57 is retained in the sleeve by means of a suitable retainer sleeve 58, threadedly engaged in the upper end thereof. The sleeve 56, like the retainer sleeve 53 at the lower end of the construction, is provided with an inwardly and upwardly opening cavity in which a suitable chevron packing 59 is arranged to seal between the body and the upper end of the shell assembly. The packing 59 is retained in the sleeve by a suitable follower 59ª threadedly engaged in the upper end of the cavity.

The clutch means H that I provide is adapted to make and break rotary driving engagement between the body D and shell F and to also limit vertical shifting and prevent displacement of the body from the mandrel E and the shell.

The means H is shown (see FIG. 12) as including an annular clutch ring 60 having a semi-circular jaw 61 depending from the lower or bottom end thereof and engageable in an upwardly opening, semi-circular recess 62 provided in the enlarged lower portion 20 of the body. The ring 60 is releasably engaged in the upper section 35 of the shell F by means of a suitable shear plug-type fastening means 63, which means is similar to that employed by securing the stop collar 48 of the bearing means G in the shell.

The ring 60 is positioned in the shell so that when the body D is elevated, the bottom end of the ring seats on the shoulder 19 on the enlarged portion 20 of the body and the jaw 61 thereof engages in the recess 62 in the body, as clearly illustrated in FIG. 2 of the drawings, and in such a manner that driving engagement is made between the shell and the body.

When the body D is lowered or urged downwardly by the weight of the drill collar and operating string occurring above the tool and against the resistance of the spring means K, as will hereinafter be described, the jaw 61 is shifted out of engagement in the recess 62 and the body D and the mandrel E are free to rotate relative to the shell F, as clearly illustrated in FIG. 4 of the drawings.

The guide shoes I provided by the present invention are elongate, vertically disposed, bar-like members and are slidably engaged in circumferentially spaced, vertically disposed, slot-like openings 65 provided in the lower section 36 of the shell F, intermediate the upper and lower ends thereof. Each shoe is shown as having flat, vertically disposed side and rear surfaces 66 and 67 (see FIGS. 8, 9 and 10), flat, horizontally disposed top and bottom surfaces 68 and a vertically disposed front having a pair of forwardly convergent surfaces 69. The front of each shoe is disposed radially outwardly of the shell and is provided with a central, outwardly opening, longitudinally disposed, dove-tailed groove 70 in which an elongate formation engaging guide blade 71 is engaged. The guide blade 71 related to each shoe is dove-tailed to establish sliding engagement in the groove 70 and has a straight, sharpened formation engaging knife edge 72 which occurs outward of the front of the shoe and extends substantially coextensive therewith.

The blades 71 are formed of suitable, hard, wear-resistant material and are maintained engaged in the grooves 70 in the shoes I by means of suitable cap screws 73 engaged in the grooves to occur at the opposite ends of the blades.

The inner or back surface of the shoes I are provided with elongate, inwardly opening recesses 74 and a plurality of vertically spaced, rearwardly opening pockets 75 in the bottom of the recess. The recesses 74 are adapted to accommodate portions of the carriage J and the pockets 75 are adapted to receive suitable connecting links 80 which extend between and connect the carriage J and the shoes, as will hereinafter be described.

The pockets 75 in the shoes I are substantially square in configuration and are provided with rounded or arcuate bottom walls 76 (see FIG. 10).

The carriage J provided by the present invention is an elongate, vertically disposed, sleeve-like member and is slidably engaged on the upper portion 25 of the mandrel E to occur within the lower section 36 of the shell F and to occur radially inwardly of the shoes I carried by the shell.

The carriage J is machined and relieved adjacent each shoe I to allow for radial inward shifting of the shoes and to establish outwardly projecting bosses 77, which bosses 77 project into the recesses 74 in the shoes. The bosses 77 correspond in configuration with the recesses 74 and are provided with vertically spaced, radially outwardly opening, link receiving pockets 78, which pockets oppose the pockets 75 in the bottoms of the recesses. The pockets 78 are substantially square and are provided with rounded or arcuate top walls 79.

The connecting links 80, referred to above, are simple, elongate members formed of bar or strap stock and are provided with rounded ends 81. The blocks are arranged between the shoes I and the carriage J to occur in the pockets 75 and 78 and so that the rounded ends 81 thereof engage and seat on the rounded top and bottom walls 78 and 76 of the pockets.

The links are maintained in proper working and bearing engagement with the carriage and the shoes by means of suitable pivot pins 82 and 83 engaged through the shoes I and the bosses 77 of the carriage and through suitable transverse openings provided in the opposite ends of the links.

The links are arranged and proportioned so that when the carriage J is urged upwardly in the construction, the shoes are drawn radially inwardly and so that when the carriage J is shifted downwardly, the shoes are urged and shifted radially outwardly, as clearly illustrated in FIGS. 2a and 4a of the drawings.

When the shoes I are in their fully out or actuated position, the links 80 are inclined downwardly at an angle of less than forty-five degrees from the horizontal, with the result that as the tool advances downwardly in the well bore, the forces exerted on the shoes tend to urge them outwardly and into tighter engagement with the well bore. They do not tend to shift inwardly and to this extent are located in their out or actuated position so long as the tool is advancing in the well.

The carriage J is arranged in the shell F and is so proportioned that when it is in its uppermost or unactuated position, its upper end engages and stops against the downwardly facing shoulder 42 at the upper end of the lower section 36 of the shell.

In addition to the foregoing, the carriage J is provided with suitable annular seals 85 at its opposite ends to seal with the interior of the shell F and thereby prevent the flow of oil out of the construction through the shoe receiving openings 65 in the shell.

In the preferred carrying out of the invention, I provide three circumferentially spaced bore engaging guide shoes I. It is to be understood however, that in practice, a greater number of shoes could be provided if desired.

The spring means K related to the body D, shell F, clutch means H and shoe actuating carriage J is shown as including a primary spring 86 adapted to yieldingly maintain the construction in an unactuated position, an intermediate or actuating spring 87 adapted to shift the carriage J to its actuated or operating position and a main work load supporting spring 88.

The primary spring 86 is a simple, helical compression spring surrounding the mandrel E to occur between the stop collar 48 of the bearing means G and the carriage J.

The spring 86 normally yieldingly urges the carriage J upwardly to the position illustrated in FIG. 2a of the drawings.

The main or work load supporting spring 88 is shown as a heavy, helical compression spring arranged about the mandrel E within the upper section 35 of the shell and between the lower terminal end or bottom of the body D and the upwardly facing shoulder 41 in the shell F. Additional structure, which occurs between the bottom of the body, the shoulder 41 and the ends of the spring 88 related thereto.

In operation, and when the bit B is engaged on the bottom of the well bore, and the weight of the drill collar and operating string is exerted onto the tool, the body D is urged downwardly in the construction, relative to the mandrel E and the shell F. When the body is shifted downwardly in the manner set forth above, the weight of the drilling string is exerted upon the bit B through the body D, the spring 88, shell F, bearing means G and mandrel E.

The spring 88 is an extremely heavy spring and is adapted to exert a predetermined, desired working pressure or load on the bit, for example a working load of twenty thousand pounds per square inch, in the event that the bit starts to bounce or chatter, elevating the tool and drill string and allowing for limited relative axial shifting of the mandrel and the body, after the tool is set and the drilling operation is in progress.

The intermediate or actuating spring 87 that I provide is adapted to shift the carriage J and to actuate the guide shoes I into engagement with the well bore, before the full working load is applied to the bit through the main spring 88 and before the bit is rotated. The above is extremely important when the tool is employed for directional drilling since the tool must be properly oriented in the well as will hereinafter be described.

The spring 87 is a simple, helical compression spring capable of withstanding about five thousand pounds and is engaged between the lower end of the main spring 88 and the upper end of the carriage J. When the body D is lowered and before the main spring 88 engages and acts upon the shell F, the spring 87, advanced by the spring 88, urges the carriage J downwardly and sets the shoes I.

It will be noted that when the body is lowered in the manner set forth above, the clutch means H disengages. When the clutch disengages and the shoes I are set the shell is held stationary, against rotation, in the well bore and the body D, the mandrel E and the bit B carried thereby can be rotated. As soon as the bit is rotating, the operating string can be lowered further and in a manner to place the full or desired work load on the bit.

It is extremely important that the full work load not be placed on the bit B before it is rotating, since a full working load, such as twenty thousand pounds, tends to lock and bind the bit, with the result that serious damage can be inflicted upon the bit and other elements of the drilling equipment when it is attempted to put it into rotation.

With the construction provided by the present invention, the tool can be oriented and set in the well and rotation of the drilling string and bit can be commenced before the full work load is applied to the bit.

In the form of the invention illustrated, a suitable antifriction bearing 90 is provided between the main spring 88 and the bottom of the body D to assure for free relative rotation therebetween.

The spring means that I provide further includes a suitable follower sleeve 91 between the main spring 88 and the carriage J. The sleeve 91 has an enlarged, radially outwardly projecting, flange-like head portion 92 to occur between the main spring and the shoulder 41 in the shell and a skirt portion 93 which depends from the head portion to engage the top of the carriage J.

In operation, after the carriage J is actuated by the spring 87 and the main spring 88 is brought into action, the main spring 88 urges the head portion 92 of the follower sleeve downwardly into seated engagement on the shoulder 41 and urges the skirt portion thereof downwardly into engagement with the top of the carriage J and maintains the carriage J in its down or actuated position.

With the above relationship of parts, it will be apparent that the main spring 88 supplements the action of the actuation spring 87 when the construction is fully actuated and in operation.

The space and void occurring between the shell F, body D and mandrel E, about and below the clutch means H, are filled with a suitable lubricating oil, which oil serves to assure free operation of the construction, prevents excessive wear and provides a suitable fluid block and prevents well circulating fluid, which generally, carries abrasive matter from entering the construction.

In order that the oil does not establish a mechanical lock and prevent or impede the satisfactory operation of the construction, and in order that the oil is not discharged from the tool and lost when the tool is actuated, I provide the oil accumulating means L.

The oil accumulating means L is shown as including an annular, longitudinal shifting piston 95 engaged about the body D above the clutch means H and a compression spring 96 occurring between the piston and the bearing sleeve 56 which is engaged in and closes the upper end of the shell. The piston 95 is an elongate, sleeve-like member and is provided with O-ring seals 97 about its exterior, at the opposite ends thereof, which seals establish sealing engagement with the interior of the shell F. The piston is further provided with a chevron-type packing 98 engaged in an upwardly, inwardly opening, annular cavity in the piston, which cavity is closed at its upper end by an annular head or ring 95$^a$, retained in engagement in the piston by suitable pins 95$^b$.

In order to prevent relative rotation between the piston 95 and the shell F, which rotation would adversely affect the seals 97, I provide a circumferentialy spaced, radially outwardly opening longitudinally disposed key-way in the piston, between the sealing means 97, and suitable radially inwardly projecting keys 100 in the shell and engageable in said key-way. The keys 100 are removable or detachable from the shell from the exterior thereof to facilitate assembly and disassembly of the construction, (see FIG. 14).

The spring 96 is a simple compression spring of minimum weight and serves to normally yieldingly urge the piston 95 downwardly in the shell and about the body.

In operation, and when the tool is actuated, the oil therein is displaced from between and around the various moving parts and flows upwardly in the construction to bear against and urge the piston 95 upwardly against the resistance of the spring 96.

In addition to the foregoing, the oiling system further includes a suitable breather M to allow for the free flow of fluid and air into and out of the annular space occurring above the piston 95 and in which the spring 96 is arranged. The breather M (see FIG. 13) involves a simple, slotted, rubber disc 101 engaged in an opening 102 in the wall of the shell F. The disc 101 is maintained in fixed position in the opening 102 by means of a suitable annular screw retainer 103 and is such that it will allow for the free flow of fluid or air into and out of the said space occurring above the piston, but will suitably prevent the passage of foreign matter into the chamber. By allowing for the free flow of air and/or fluid into and out of the shell above the piston 95, a fluid lock cannot be established in the construction which would prevent or adversely affect its satisfactory operation.

With the relationship of parts set forth above, it will be apparent that the critical working parts of my construction are sealed in oil at all times and are, therefore, fully protected.

When the tool A that I provide is to be employed in a direction drilling operation, one shoe I of lesser radial extent than the other two shoes, that is to say, a smaller or undergauged shoe is substituted for one of the regular shoes. As a result of such a substitution and relationship of parts, when the shoes are actuated into bearing engagement with the well bore, the tool A and the bit B carried thereby are urged off center in the direction of the smaller shoe and as drilling progresses, the well bore is deflected radially in the direction of the said smaller shoe.

In FIGS. 5 and 6 of the drawings, I have designated the three shoes, X, Y and Z. Upon a study of the drawings, it will be seen that shoes Y and Z are alike, while shoe X is smaller, that is, it is of less radial extent than shoes Y and Z.

In FIG. 5 of the drawings, the shoes are shown in their unactuated position and on the longitudinal axis of the well bore. In FIG. 6 of the drawings, the shoes are shown actuated into engagement with the well bore and the longitudinal axis of the tool A is offset from the longitudinal axis of the well bore towards the smaller shoe X.

It will be apparent that when the tool A that I provide is employed in directional drilling operations, it can be easily oriented in the well bore by rotating the drilling string and drill collar with which the tool is related to a predetermined rotative position and so that the shoe X thereof is in the desired position, before the shoes are set and the clutch H is released to allow for free relative rotation between the shell and the body and mandrel.

FIG. 16 if the drawings is similar to FIG. 5, on a reduced scale and shows the several shoes I alike and of equal radial extent. In this form of the invention, the structure is adapted for use as a stabilizer.

It will be further apparent that when it is desired to pull the tool A that I provide from the well bore in which it is engaged, it is only necessary that the operating string and the body D be elevated slightly and rotated until the clutch means H re-engages, whereupon all of the elements of the construction will return to their normal or unactuated position and the tool can be freely withdrawn from the well.

Having described only a typical preferred form and application of my invention, I do not wish to be limited or restricted to the specific details herein set forth, but wish to reserve to myself any modifications or variations that may appear to those skilled in the art and fall within the scope of the following claims:

Having described my invention, I claim:

1. A well drilling tool engageable between the lower end of a string of drill pipe and a rotary bit including, an elongate, vertically disposed, fluid conducting body having a splined socket entering its lower end and secured to and depending from the drill pipe spring, an elongate, vertically disposed, fluid conducting mandrel having a splined upper end portion secured to and projecting upwardly from the bit with its splined portion telescopically engaged in the socket in the body to prevent relative rotation and allow for relative axial shifting between the body and mandrel, an elongate, vertically disposed, tubular shell surrounding the mandrel and the body and having a plurality of circumferentially spaced openings therein, means coupling the shell to the body for free relative rotation and for limited relative axial shifting, anti-friction bearing means coupling the lower end of the shell to the mandrel for free relative rotation and against relative axial shifting, an axially shiftable carriage in the shell and surrounding the mandrel, a plurality of circumferentially spaced bore engaging shoes engaged in the openings in the shell for radial shifting only, means operatively connecting the carriage to the shoes to urge the shoes radially outwardly in the openings in the shell upon downward movement of the carriage, a first spring means between the shell and the carriage yieldingly urging the carriage upwardly, and a second spring means in the shell between the lower end of the body and the carriage to urge the carriage downwardly against the resistance of the first spring means upon downward movement of the body relative to the mandrel and the shell.

2. A well drilling tool engageable between the lower end of a string of drill pipe and a rotary bit including, an elongate, vertically disposed, fluid conducting body with a splined socket entering its lower end and secured to and depending from the drill pipe string, an elongate, vertically disposed, fluid conducting mandrel having a splined upper end portion secured to and projecting upwardly from the bit and with the splined portion telescopically engaged in the socket in the body to prevent relative rotation and permit relative axial shifting between the body and mandrel, an elongate, vertically disposed, tubular shell surrounding the mandrel and the body and having a plurality of circumferentially spaced openings therein, bearing means coupling the shell to the body for free relative rotation and for limited relative axial shifting, anti-friction bearing means between and coupling the lower end of the shell to the mandrel for free relative rotation and against the relative axial shifting, a plurality of circumferentially spaced, radially projecting bore engaging shoes slidably engaged in the openings in the shell, and axially shiftable carriage in the shell and about the mandrel, link means operatively connecting the carriage to the shoes to urge the shoes radially outwardly in the openings upon downward movement of the body relative to the shell, spring means in the shell below the carriage and normally yieldingly urging the carriage upwardly, a second spring means in the shell between the top of the carriage and the bottom of the body to urge the carriage downwardly against the resistance of the first spring means upon downward shifting of the body relative to the shell and the mandrel, one of said circumferentially spaced shoes being of less radial extent than the other shoes whereby the well drilling tool, bit and drill pipe string are urged laterally of the longitudinal axis of the well bore in one direction when the tool is actuated.

3. A well drilling tool engageable between the lower end of a string of drill pipe and a rotary bit including, an elongate, vertically disposed, fluid conducting body having an elongate splined socket entering its lower end secured to and depending from the drill pipe string, an elongate, vertically disposed, fluid conducting mandrel having an elongate splined upper end portion secured to and projecting upwardly from the bit with the upper part of said splined portion telescopically engaged in the lower portion of the splined socket in the body for rotary driving engagement and free axial shifting therebetween, an elongate, vertically disposed, tubular shell surrounding the mandrel and the body and having a plurality of circumferentially spaced openings therein, anti-friction bearing means between and securing the shell to the body for free relative rotation and for limited relative axial shifting, anti-friction bearing means rotatably coupling the lower end of the shell to the mandrel, a plurality of elongate, vertically disposed, circumferentially spaced bore engaging guide shoes slidably engaged in the openings in the shell, means within the shell to urge the shoes radially outwardly upon downward movement of the body relative to the shell and including, a longitudinally shiftable carriage slidably engaged about the mandrel and within the shell, a plurality of downwardly and radially outwardly inclined links pivotally connected with and extending between the carriage and the shoes, and a first spring means in the shell below the carriage and normally yieldingly urging the carriage upwardly in the shell and about the body, a second spring means between the body and the top of the carriage to yieldingly urge the carriage downwardly against the resistance of the first spring means to shift the shoes outwardly upon initial downward movement of the body relative to the shell and upon the application of a limited part of the weight of the drill string through the tool and onto the bit.

4. A well drilling tool engageable between the lower end of a string of drill pipe and a rotary bit including, an elongate, vertically disposed, fluid conducting body having a splined socket entering its lower end secured to and depending from the drill pipe string, an elongate, vertically disposed, fluid conducting mandrel having a splined upper end portion secured to and projecting upwardly from the bit and telescopically engaged in the socket in the body for rotary driving engagement and free axial shifting therebetween, an elongate, vertically disposed, tubular shell surrounding the mandrel and the body in spaced relationship therewith and having a plurality of circumferentially spaced openings therein, bearing means between the body and the shell, coupling the body and shell for free relative rotation and limited relative axial shifting, anti-friction bearing means rotatably coupling the lower end of the shell to the mandrel, a plurality of elongate, vertically disposed, circumferentially spaced bore engaging guide shoes slidably engaged in the openings in the shell, means to urge the shoes radially outwardly upon downward movement of the body relative to the shell, including, an elongate, vertically disposed, longitudinally shiftable carriage slidably engaged about the mandrel and within the shell to occur radially inwardly of and to extend above and below said openings, a plurality of downwardly and radially outwardly inclined links pivotally connected with and extending between the carriage and the shoes, a first spring means in the shell to engage the bottom of the carriage and normally yieldingly hold it up in the shell, and a second spring means between the body and the top of the carriage to yieldingly urge the carriage downwardly against the resistance of the first spring means and shift the shoes outwardly upon initial downward movement of the body relative to the shell and upon the application of a limited part of the weight of the drill string through the tool and onto the bit, sealing means between the upper and lower ends of the shell and the body and mandrel, and sealing means between the upper and lower ends of the carriage and the shell, the annular space between the shell and the body and mandrel being filled with oil.

5. A well drilling tool engageable between the lower end of a string of drill pipe and a rotary bit including, an elongate, vertically disposed, fluid conducting body secured to and depending from the drill pipe string, an elongate, vertically disposed, fluid conducting mandrel secured to and projecting upwardly from the bit, splined coupling means at the lower end of the body and the upper end of the mandrel coupling said body and mandrel for free longitudinal shifting and against relative rotation, an elongate, vertically disposed, tubular shell surrounding the mandrel and the body and having three circumferentially spaced, vertically disposed slot-like openings therein, bearing means between and coupling the shell to the body for free relative rotation and for limited relative axial shifting, an anti-friction means coupling the shell to the mandrel for free relative rotation and against relative axial shifting, an elongate, vertically disposed bore engaging guide shoe slidably engaged in each opening in the shell, and having a vertically disposed, radially outwardly projecting formation engaging blade, a carriage slidably engaged in the shell and about the mandrel, link means between the carriage and the shoes, a first spring means below the carriage and normally yieldingly urging the carriage upwardly, a second spring means between the bottom of the body and the carriage and to yieldingly urge the carriage downwardly against the resistance of the first spring means and to urge the shoes radially outwardly relative to the shell and in the openings upon downward movement of the body relative to the shell, and clutch means between the body and the shell to normally establish rotary driving engagement therebetween and to break said driving engagement upon downward shifting of the body relative to the shell.

6. A structure as set forth in claim 5, wherein said clutch means includes a part on the body having an upwardly opening recess and a part carried by the shell and having a downwardly projecting jaw engageable in said recess.

7. A well drilling tool engageable between the lower end of a string of drill pipe and a rotary bit including, an elongate, vertically disposed, fluid conducting body secured to and depending from the drill pipe string, an elongate, vertically disposed, fluid conducting mandrel secured to and projecting upwardly from the bit, coupling means including a splined part on the lower end of the body telescopically engaged with a splined part on the upper end of the mandrel and allowing for free longitudinal shifting and preventing relative rotation between the body and mandrel, an elongate, vertically disposed, tubular shell surrounding the mandrel and the body in spaced relationship therewith and having circumferentially spaced openings adjacent the mandrel, bearing means between and coupling the shell to the body for free relative rotation and for limited relative axial shifting, sealing means at the upper and lower ends of the shell and sealing with the body and the mandrel, anti-friction bearing means rotatably coupling the shell to the mandrel, a bore engaging guide shoe slidably engaged in each opening in the shell, an axially shiftable carriage in the shell and about the mandrel, link means between the carriage and the shoes connecting and supporting the shoes on the body to urge the shoes radially outwardly upon downward movement of the carriage relative to the shell, a first spring means normally urging the carriage upwardly in the shell, a second spring means between the carriage and the body to yieldingly urge the carriage downwardly upon downward movement of the body relative to the shell, sealing means related to said carriage to seal about the openings in the shell, clutch means between the body and the shell to normally establish rotary driving engagement therebetween and adapted to break said driving engagement upon downward shifting of the body relative to the shell, said clutch means including an enlargement at the lower end of the body having an upwardly opening recess and an annular collar carried by the shell and having a downwardly projecting jaw engageable in said recess, an annular piston establishing sliding sealing engagement about the body and in the shell above the clutch means and a breather opening in the shell above the piston, the space between the shell and the body and mandrel occurring below the piston being filled with oil, said piston being adapted to be shifted upwardly about the body and in the shell when the body is urged downwardly in the shell and relative to the mandrel and in a manner to displace the oil in the construction below the piston.

8. The structure set forth in claim 7, wherein said link means includes, a plurality of normally downwardly and radially outwardly inclined links connected with and extending between the shoes and the carriage.

9. A stabilizing tool engageable between a string of drill pipe and a rotary bit including, an elongate, vertically disposed, tubular body secured to and depending from the lower end of the drill pipe and having a splined socket entering its lower end, an elongate, vertically disposed, tubular mandrel secured to and projecting upwardly from the bit and having its upper end splined and telescopically engaged in the socket in the lower end of the body, an elongate, vertically disposed tubular shell surrounding the body and the mandrel and having an annular shoulder intermediate its ends, bearing means mounting the lower end of the shell to the mandrel for relative rotation and against longitudinal shifting, clutch means establishing driving engagement between the body and the shell and adapted to be disengaged upon downward movement of the body in the shell and relative to the mandrel, a plurality of circumferentially spaced well bore engaging guide shoes shiftably carried by the body, a tubular carriage slidably carried by the mandrel, links fixed to and extending between the carriage and the shoes and adapted to urge the shoes radially outwardly relative to the shell upon downward movement of the carriage on the mandrel, a first compression spring within the shell below the carriage and adapted to normally yieldingly urge the carriage upwardly on the mandrel, a second compression spring between the bottom end of the body and the shoulder in the shell and normally spaced above the shoulder and a third compression spring between the bottom of said second spring and the carriage, said third spring being lighter than the second spring and adapted to shift the carriage downwardly to actuate the shoes upon initial and limited downward movement of the body and the second spring relative to the shell, said second spring adapted to engage said shoulder and exert the weight of the drill collar through the shell and onto the bit upon further downward movement of the body in the shell and relative to the mandrel.

10. A stabilizing tool engageable between a string of drill pipe and a rotary bit including, an elongate, vertically disposed, tubular body secured to and depending from the lower end of the drill pipe and having a splined socket entering its lower end, an elongate, vertically disposed, tubular mandrel secured to and projecting upwardly from the bit and having its upper end splined and telescopically engaged in the socket in the lower end of the body, an elongate, vertically disposed, tubular shell with three circumferentially spaced, vertically disposed slot-like openings in its lower end portion surrounding the body and the mandrel and having an annular shoulder intermediate its ends, anti-friction bearing means mounting the lower end of the shell to the mandrel for relative rotation and against longitudinal shifting, clutch means establishing driving engagement between the body and the shell and adapted to be disengaged upon downward movement of the body in the shell and relative to the mandrel, an elongate, vertically disposed well bore engaging guide shoe shiftably carried in each opening in the body, a tubular carriage slidably carried by the mandrel, links fixed to and extending between the carriage and the shoes and adapted to urge the shoes radially outwardly relative to the shell upon downward movement of the carriage on the mandrel, a first compression spring within the shell below the carriage and adapted to normally yieldingly urge the carriage upwardly on the mandrel, a second compression spring between the bottom end of the body and the shoulder in the shell and normally spaced above the shoulder and a third compression spring between the bottom of said second spring and the carriage, said third spring being lighter than the second spring and adapted to shift the carriage downward and to actuate the shoes upon initial and limited downward movement of the body and the second spring relative to the shell, said second spring adapted to engage said shoulder and exert the weight of the drill collar through the shell and onto the bit upon further downward movement of the body in the shell and relative to the mandrel and an elongate follower sleeve having a head portion disposed between the lower end of the said second spring and said shoulder and a depending skirt portion adapted to engage the upper end of the carriage when the tool is fully actuated.

11. A stabilizing tool engageable between a string of drill pipe and a rotary bit including, an elongate, vertically disposed, tubular body secured to and depending from the lower end of the drill pipe and having a splined socket entering its lower end, an elongate, vertically disposed tubular mandrel secured to and projecting upwardly from the bit and having its upper end splined and telescopically engaged in the socket in the lower end of the body, an elongate, vertically disposed, tubular shell with three circumferentially spaced, vertically disposed slot-like openings in its lower end portion surrounding the body and the mandrel and having an annular shoulder intermediate its ends, anti-friction bearing means mounting the lower end of the shell to the mandrel for relative rotation and against longitudinal shifting, clutch means establishing driving engagement between the body and the shell and adapted to be disengaged upon downward movement of the body in the shell and relative to the mandrel, an elongate, vertically disposed well bore engaging guide shoe shiftably carried in each opening in the body, a tubular carriage slidably carried by the mandrel, links fixed to and extending between the carriage and the shoes and adapted to urge the shoes radially outwardly relative to the shell upon downward movement of the carriage on the mandrel, a first compression spring within the shell below the carriage and adapted to normally yieldingly urge the carriage upwardly on the mandrel, a second compression spring between the bottom end of the body and the shoulder in the shell and normally spaced above the shoulder and a third compression spring and the carriage, said third spring being lighter than the second spring and adapted to shift the carriage downwardly and to actuate the shoes upon initial and limited downward movement of the body and the second spring relative to the shell, said second spring adapted to engage said shoulder and exert the weight of the drill collar through the shell and onto the bit upon further downward movement of the body in the shell and relative to the mandrel and an elongate follower sleeve having a head portion disposed between the lower end of the said second spring and said shoulder and a depending skirt portion adapted to engage the upper end of the carriage when the tool is fully actuated, one of said shoes being of lesser radial extent than the others whereby the drill string and the bit are urged laterally out of alignment with the axis of the well bore when the tool is actuated.

References Cited

UNITED STATES PATENTS

| | | | |
|---|---|---|---|
| 1,406,350 | 2/1922 | Corrigan | 175—98 X |
| 2,119,095 | 5/1938 | Brummett | 175—73 |
| 2,645,459 | 7/1953 | Sutliff | 175—297 |
| 2,891,769 | 6/1959 | Page et al. | 175—76 |
| 2,915,286 | 12/1959 | Wright | 175—76 |
| 3,196,959 | 7/1965 | Kammerer | 175—73 |
| 3,298,449 | 1/1967 | Bachman et al. | 175—76 |

ERNEST R. PURSER, *Primary Examiner.*